(12) United States Patent
Li (10) Patent No.: US 11,889,193 B2
(45) Date of Patent: Jan. 30, 2024

(54) ZOOM METHOD AND APPARATUS, UNMANNED AERIAL VEHICLE, UNMANNED AIRCRAFT SYSTEM AND STORAGE MEDIUM

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 0 days.

(21) Appl. No.: 17/661,322

(22) Filed: Apr. 29, 2022

(65) Prior Publication Data

US 2022/0264017 A1 Aug. 18, 2022

Related U.S. Application Data

(63) Continuation of application No. PCT/CN2020/124054, filed on Oct. 27, 2020.

(30) Foreign Application Priority Data

Nov. 1, 2019 (CN) .......................... 201911061004.X (51) Int. Cl.
*H04N 23/69* (2023.01)
*H04N 5/262* (2006.01)
(Continued)

(52) U.S. Cl.
CPC ........... *H04N 23/69* (2023.01); *H04N 5/2628* (2013.01); *H04N 7/183* (2013.01); *H04N 23/57* (2023.01); *H04N 23/66* (2023.01)

(58) Field of Classification Search
CPC ...... H04N 23/69; H04N 5/2628; H04N 7/183; H04N 23/57; H04N 23/66; H04N 7/185;
(Continued)

(56) References Cited

U.S. PATENT DOCUMENTS 9,620,168 B1 * 4/2017 Townsend ................. G06T 7/90
11,076,101 B2 * 7/2021 Kim .......................... G02B 7/02
(Continued)

FOREIGN PATENT DOCUMENTS

CN 101282422 A 10/2008
CN 102857684 A 1/2013
(Continued)

OTHER PUBLICATIONS

Supplementary European Search Report; dated Nov. 25, 2022; Appln. No. 20881372.5.
(Continued)

*Primary Examiner* — Chiawei Chen (57) ABSTRACT

The embodiments are a zoom method and apparatus, an unmanned aerial vehicle, an unmanned aircraft system and a storage medium. The zoom method is applied to an unmanned aerial vehicle including an image capturing apparatus and the method includes: controlling the image capturing apparatus to capture an initial image, where a resolution of the initial image is $W_0*H_0$ and an area of the initial image is $S_0$; obtaining a cropped image according to the initial image, where the cropped image is an image with an area of S cropped from a preset region in the initial image, $S_0/S=C$ and C is a digital zoom factor of the image capturing apparatus; and obtaining a zoom image according to the cropped image, where the zoom image is an image obtained by zooming the cropped image by C/A times, a resolution of the zoom image is $W_1*H_1$, $A=W_0/W_1$ and $C \leq A$.

15 Claims, 5 Drawing Sheets

(51) Int. Cl.
  *H04N 7/18* (2006.01)
  *H04N 23/57* (2023.01)
  *H04N 23/66* (2023.01)
(58) Field of Classification Search
  CPC .. H04N 23/661; H04N 23/67; B64U 2101/30; B64C 27/08; B64D 47/08
  See application file for complete search history.

(56) References Cited

U.S. PATENT DOCUMENTS

| | | | | |
|---|---|---|---|---|
| 2006/0170793 A1* | 8/2006 | Pasquarette | ............ | H04N 23/69 348/240.99 |
| 2006/0290792 A1* | 12/2006 | Nikkanen | ............ | H04N 5/2628 348/240.2 |
| 2008/0193047 A1* | 8/2008 | Mitani | ............ | H04N 23/63 382/282 |
| 2009/0179998 A1* | 7/2009 | Steinberg | ............ | H04N 23/67 348/222.1 |
| 2013/0057731 A1* | 3/2013 | Rodriguez | ............ | G06T 3/00 348/240.1 |
| 2017/0041553 A1 | 2/2017 | Cao et al. | | |
| 2017/0094184 A1* | 3/2017 | Gao | ............ | G06T 7/337 |
| 2017/0256288 A1* | 9/2017 | Ai | ............ | H04N 5/2628 |
| 2018/0332213 A1* | 11/2018 | Kucharski | ............ | G05D 1/0094 |

FOREIGN PATENT DOCUMENTS

| | | | | |
|---|---|---|---|---|
| CN | 102868855 A | 1/2013 | | |
| CN | 106713740 A | 5/2017 | | |
| CN | 108476289 A | 8/2018 | | |
| CN | 111050066 A | 4/2020 | | |
| EP | 2326079 B1 * | 7/2015 | ......... | H04N 1/00307 |

OTHER PUBLICATIONS

PCT International Search Report dated Jan. 29, 2021; PCT/CN2020/124054 with English Translation.

* cited by examiner

ZOOM METHOD AND APPARATUS, UNMANNED AERIAL VEHICLE, UNMANNED AIRCRAFT SYSTEM AND STORAGE MEDIUM

CROSS-REFERENCE TO RELATED APPLICATIONS

The present application is a continuation of International Patent Application No. PCT/CN2020/124054 filed on Oct. 27, 2022, which claims priority to Chinese Patent Application No. 201911061004.X filed on Nov. 1, 2019, both of which are incorporated herein by reference in their entireties.

TECHNICAL FIELD

The present invention relates to the field of zoom control technologies, and in particular, to a zoom method and apparatus, an unmanned aerial vehicle, an unmanned aircraft system and a storage medium.

BACKGROUND

With the continuous development of unmanned aerial vehicles, the unmanned aerial vehicles have been applied to more fields. Using the unmanned aerial vehicles to capture images, which is also referred to as aerial photograph, is more common in most fields to which the unmanned aerial vehicles are applied.

To view more image details in the aerial photograph, the image needs to be zoomed in by through zoom. As a common zoom manner, digital zoom is applied to the aerial photograph. The traditional digital zoom can only scale an original image size, to make the image displayed larger on a terminal screen communicatively connected to the unmanned aerial vehicle. However, the image details cannot be displayed more clearly in this way.

Therefore, how to resolve the problem that the image is unclear after traditional digital zoom has become a research hotspot of a person skilled in the art.

SUMMARY

A main objective of the present invention is to provide a zoom method and apparatus, an unmanned aerial vehicle, an unmanned aircraft system and a storage medium.

To achieve the foregoing objective, the present invention provides a zoom method, applied to an unmanned aerial vehicle including an image capturing apparatus, the method including:

controlling the image capturing apparatus to capture an initial image, where a resolution of the initial image is $W_0*H_0$ and an area of the initial image is $S_0$;

obtaining a cropped image according to the initial image, where the cropped image is an image with an area of S cropped from a preset region in the initial image, $S_0/S=C$ and C is a digital zoom factor of the image capturing apparatus; and obtaining a zoom image according to the cropped image, where the zoom image is an image obtained by zooming the cropped image by C/A times, a resolution of the zoom image is $W_1*H_1$, $A=W_0/W_1$ and $C \leq A$.

Preferably, the controlling the image capturing apparatus to capture an initial image includes:

obtaining an image capturing instruction, where the image capturing instruction is an instruction transmitted by a user by operating a terminal device communicatively connected to the unmanned aerial vehicle; and controlling, according to the image capturing instruction, the image capturing apparatus to capture the initial image.

Preferably, the obtaining a cropped image according to the initial image includes:

obtaining a digital zoom factor of the image capturing apparatus; and cropping, according to the digital zoom factor, an image with an area of S from a preset region in the initial image as the cropped image, where $S_0/S=C$ and C is the digital zoom factor of the image capturing apparatus.

Preferably, the obtaining a zoom image according to the cropped image includes:

setting a resolution of the zoom image; and zooming the cropped image according to the resolution and the digital zoom factor, to obtain the zoom image, where a zoom factor is C/A, the resolution of the zoom image is $W_1*H_1$, $A=W_0/W_1$ and $C \leq A$.

Preferably, the method further includes:

transmitting the zoom image to a terminal device communicatively connected to the unmanned aerial vehicle, to display the zoom image on a display screen of the terminal device, where an image resolution of the display screen is less than or equal to $W_1*H_1$.

Preferably, the method further includes storing the zoom image.

The present invention further provides a zoom apparatus, applied to an unmanned aerial vehicle including an image capturing apparatus, the zoom apparatus including:

an image capturing module, configured to control the image capturing apparatus to capture an initial image, where a resolution of the initial image is $W_0*H_0$ and an area of the initial image is $S_0$;

an image cropping module, configured to obtain a cropped image according to the initial image, where the cropped image is an image with an area of S cropped from a preset region in the initial image, $S_0/S=C$ and C is a digital zoom factor of the image capturing apparatus; and an image zoom module, configured to obtain a zoom image according to the cropped image, where the zoom image is an image obtained by zooming the cropped image by C/A times, a resolution of the zoom image is $W_1*H_1$, $A=W_0/W_1$ and $C \leq A$.

The present invention further provides an unmanned aerial vehicle. The unmanned aerial vehicle includes a vehicle body, vehicle arms connected to the vehicle body, power apparatuses disposed on the vehicle arms, an image capturing apparatus connected to the vehicle body and a vision chip disposed in the vehicle body. The vision chip includes:

a memory and a processor, where the image capturing apparatus is electrically connected to the processor;

the memory is configured to store a zoom program executable on a computer; and the processor is configured to invoke the zoom program executable on the computer to implement the foregoing zoom method.

The present invention further provides an unmanned aircraft system. The unmanned aircraft system includes an unmanned aerial vehicle and a terminal device communicatively connected to the unmanned aerial vehicle. The unmanned aerial vehicle includes a vehicle body, vehicle arms connected to the vehicle body, power apparatuses disposed on the vehicle arms, an image capturing apparatus connected to the vehicle body and a vision chip disposed in the vehicle body. The vision chip includes:

a memory and a processor, where the memory is configured to store a zoom program executable on a computer; and the processor is configured to invoke the zoom program executable on the computer to implement the foregoing zoom method.

The present invention further provides a storage medium. The storage medium stores a zoom program executable on a computer, the zoom program, when invoked by a processor, performing the foregoing zoom method.

Compared with the prior art, the present invention provides a zoom method, applied to an unmanned aerial vehicle including an image capturing apparatus, the method including: controlling the image capturing apparatus to capture an initial image, where a resolution of the initial image is $W_0*H_0$ and an area of the initial image is $S_0$; obtaining a cropped image according to the initial image, where the cropped image is an image with an area of S cropped from a preset region in the initial image, $S_0/S=C$ and C is a digital zoom factor of the image capturing apparatus; and obtaining a zoom image according to the cropped image, where the zoom image is an image obtained by zooming the cropped image by C/A times, a resolution of the zoom image is $W_1*H_1$, $A=W_0/W_1$ and $C \leq A$. The zoom method provided in the present invention resolves the problem that the image is unclear by only zooming in the image during traditional digital zoom.

DETAILED DESCRIPTION

To make the objectives, technical solutions and advantages of the present invention clearer and more comprehensible, the following further describes the present invention in detail with reference to the accompanying drawings and embodiments. It should be understood that the embodiments described herein are provided for illustrating the present invention and are not intended to limit the present invention. All other embodiments obtained by a person of ordinary skill in the art based on the embodiments of the present invention without creative efforts shall fall within the protection scope of the present invention.

The terms such as "first", "second", "third" and "fourth" (if any) in this specification, claims and the accompanying drawings of the present application are used for distinguishing between similar objects and are not necessarily used for describing any particular order or sequence. It is to be understood that the data used in such a way is interchangeable in proper cases, so that the embodiments described herein can be implemented in other orders other than the order illustrated or described herein. In addition, the terms "include", "contain" and any other variants thereof are intended to cover the non-exclusive inclusion, for example, a process, method, system, product or device that includes a series of steps or units is not necessarily limited to such expressly listed steps or units, but may include other steps or units not expressly listed or inherent to such a process, method, product or device.

It is to be noted that, the terms such as "first" and "second" involved in the present invention are merely used for descriptive purposes and shall not be understood as indicating or implying relative importance or implying a quantity of indicated technical features. Therefore, features defining "first" and "second" may explicitly or implicitly include at least one of such features. In addition, technical solutions of various embodiments may be combined with each other but need to be based on the technical solutions that can be implemented by a person of ordinary skill in the art. When a combination of the technical solutions is contradictory or cannot be implemented, it should be considered that such a combination of the technical solutions does not exist and does not fall within the protection scope of the present invention.

The present invention provides a zoom method and apparatus, an unmanned aerial vehicle, an unmanned aircraft system and a storage medium. The zoom method is applied to an unmanned aerial vehicle and includes: controlling an image capturing apparatus to capture an initial image, where a resolution of the initial image is $W_0*H_0$ and an area of the initial image is $S_0$; obtaining a cropped image according to the initial image, where the cropped image is an image with an area of S cropped from a preset region in the initial image, $S_0/S=C$ and C is a digital zoom factor of the image capturing apparatus; and obtaining a zoom image according to the cropped image, where the zoom image is an image obtained by zooming the cropped image by C/A times, a resolution of the zoom image is $W_1*H_1$, $A=W_0/W_1$ and $C \leq A$.

Figure 1:
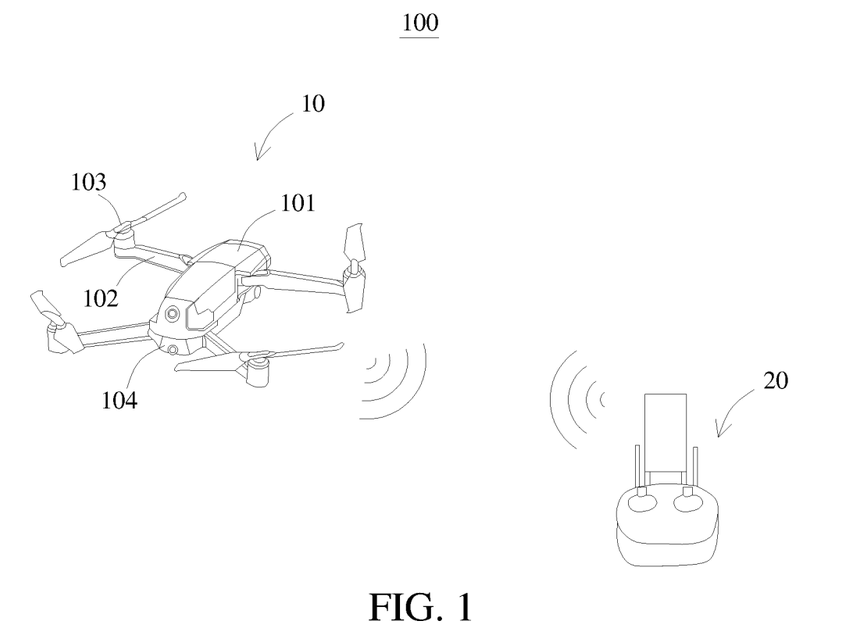
FIG. 1 is a schematic structural diagram of a framework of an unmanned aircraft system according to an embodiment of the present invention.

In the zoom method provided in the present invention, an initial image is usually obtained by an image capturing apparatus, 1/C of the initial image is cropped according to a digital zoom factor of the image capturing apparatus to obtain a cropped image and then a zoom image is obtained by zooming the cropped image in a preset proportion. The zoom image at least reaches a maximum resolution of an image player on which the image is about to be displayed, so that the image can be nondestructively displayed on a terminal, thereby resolving the problem that the image is unclear by only zooming in the image during traditional digital zoom. FIG. 1 shows an unmanned aircraft system 100 provided in the present invention. The unmanned aircraft system includes an unmanned aerial vehicle 10 and a terminal device 20 communicatively connected to the unmanned aerial vehicle 10.

The terminal device 20 may be, for example, a smartphone, a tablet computer, a computer, a remote controller. A user may interact with the terminal device 20 by using one or more user interactive devices of any suitable type such as a mouse, a key or a touch screen. A communication connection may be established between the unmanned aerial vehicle 10 and the terminal device 20 by using wireless communication modules such as a signal receiver and a signal transmitter respectively disposed inside the unmanned aerial vehicle 10 and the terminal device 20, to upload or deliver data/instructions.

The unmanned aerial vehicle 10 may be a rotor unmanned aerial vehicle such as a quadrotor unmanned aerial vehicle or a hexarotor unmanned aerial vehicle or may be a fixed-wing unmanned aerial vehicle. The terminal device 20 is configured to transmit a control instruction to the unmanned aerial vehicle 10 to control the unmanned aerial vehicle 10. The terminal device 20 may be a remote controller or a smartphone.

The unmanned aerial vehicle 10 includes a vehicle body 101, vehicle arms 102 connected to the vehicle body 101, power apparatuses 103 disposed on the vehicle arms 102 and a control system (not shown in the figure) disposed in the vehicle body 101.

The power apparatuses 103 are configured to provide thrust and lift for the unmanned aerial vehicle 10 to fly. The control system is a nerve center of the unmanned aerial vehicle 10 and may include a plurality of functional modules, for example, a flight control system, a tracking system, a path planning system and other systems having specific functions. The flight control system includes various sensors such as an IMU, a gyroscope and an accelerometer. The flight control system is configured to control a flight attitude of the unmanned aerial vehicle 10. The path planning system is configured to plan a flight path of the unmanned aerial vehicle 10 based on a position of a tracked target position and instruct the flight control system to control the flight attitude of the unmanned aerial vehicle 10, so that the unmanned aerial vehicle 10 flies in a specified path. The tracking system includes an image capturing apparatus 104 connected to the vehicle body 101 and a vision chip disposed in the vehicle body 101. The image capturing apparatus 104 is communicatively connected to the vision chip and is configured to capture and obtain media data such as images or videos of a to-be-tracked target. The vision chip is configured to determine to recognize the to-be-tracked target from the media data, to generate a corresponding tracking control instruction. The image capturing apparatus 104 may be a high-definition digital camera or another image capturing apparatus. The image capturing apparatus 104 may be disposed at any position suitable for image capturing. In some embodiments, the image capturing apparatus 104 is mounted at the bottom of the vehicle body 101 by using a gimbal. In some embodiments, the vision chip may alternatively be disposed in the vehicle arms 102.

The vision chip may frame and track the target in a target box according to features of the target.

It may be understood that, the image capturing apparatus 104 may further capture images or videos based on an image capturing instruction transmitted by the user by operating the terminal device 20 and then transmit the captured images or videos to the terminal device 20 by using an image transmission apparatus (not shown in the figure) disposed in the unmanned aerial vehicle 10, thereby displaying the captured images or videos on a display screen of the terminal device 20.

Figure 2:
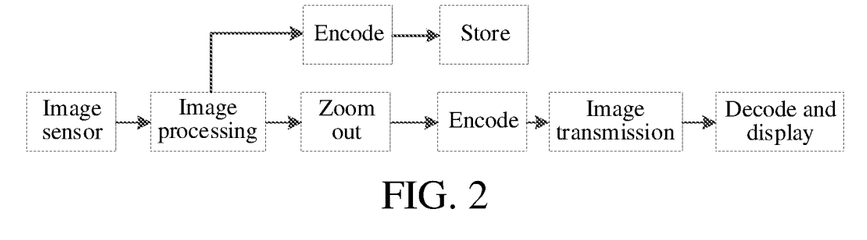
FIG. 2 is a block flowchart of a zoom method in the prior art.

FIG. 2 is a block flowchart of a zoom method for existing unmanned aerial vehicle aerial photograph from image capturing to image display on the terminal device 20.

After capturing an initial image, an image sensor of the image capturing apparatus 104 transmits the initial image to an image processing unit (not shown in the figure) of the unmanned aerial vehicle 10 for preprocessing and then divides the processed image into two images, where one image is encoded in a form of an original image and then is stored in a memory of the unmanned aerial vehicle 10, and the other image is zoomed out for encoding and then is decoded and displayed on the terminal device 20 on the ground by using a wireless image transmission apparatus.

During traditional digital zoom, a target region is directly framed during display of the terminal device 20 and then the region is zoomed in for full-screen display by using a zoom function of a graphics card. This manner is simple and intuitive and has high operability. However, the image transmitted by the wireless image transmission apparatus has been zoomed out and encoded and consequently the image definition may be very poor after the image is zoomed in again.

Figure 3A:
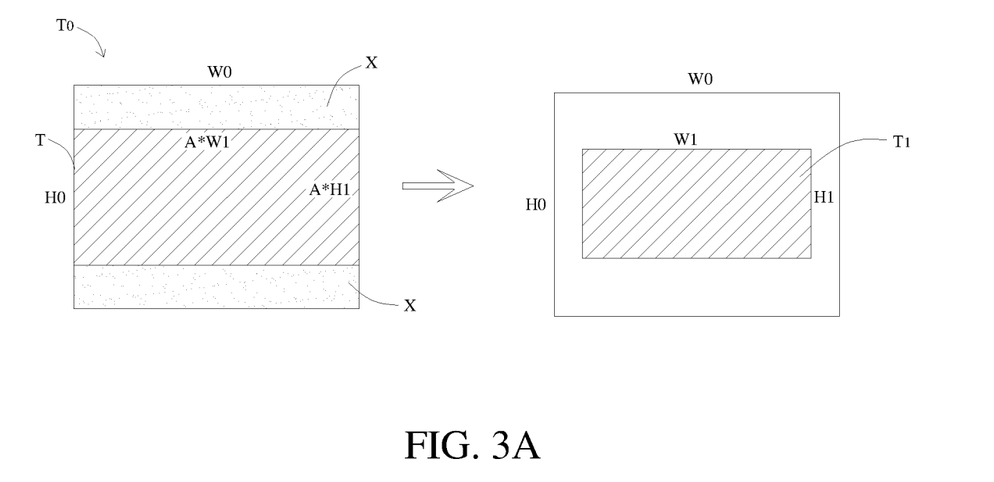
FIG. 3A is a variation diagram of an image zoom process in the prior art.
Figure 3B:
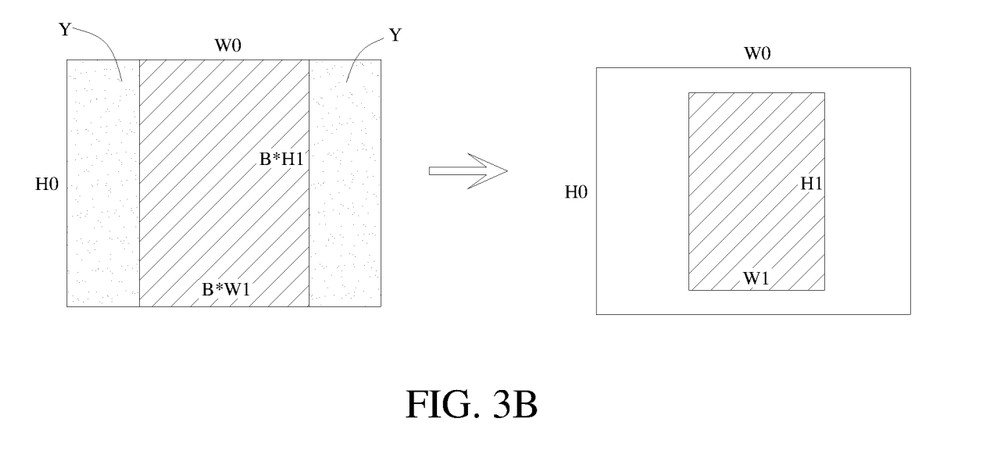
FIG. 3B is a variation diagram of another image zoom process in the prior art.

Referring to FIG. 3A and FIG. 3B, it is assumed that an allowable maximum resolution of the image sensor of the image capturing apparatus 104 is $W_0*H_0$, a resolution of the image stored in the memory is $W_1*H_1$ and a resolution of the image transmitted from the image transmission apparatus to the terminal device 20 is $W_2*H_2$. A field of view of the image transmission apparatus is usually the same as a field of view of the image stored in the memory. Therefore, a digital zoom principle of the image transmission apparatus is consistent with a principle of storing the image in the memory.

Description is made below by using an example in which the image obtained by the image capturing apparatus 104 is stored in the memory of the unmanned aerial vehicle 10.

As shown in FIG. 3A, it is assumed that $A=W_0/W_1$ and $B=H_0/H_1$.

If $B>A$, a resolution of an initial image $T_0$ obtained by the image capturing apparatus 104 is $W_0*H_0$, that is, the initial image $T_0$ has a width of $W_0$, a height of $H_0$ and an initial area of $S_0$. Since the resolution of the image stored in the memory is $W_1*H_1$ and it is necessary to ensure that the zoomed out image will not be stretched and deformed, upper and lower regions on two opposite sides of the initial image $T_0$, namely, two X parts need to be cropped to obtain a cropped image T and then the cropped image T is zoomed out by A times to obtain a zoom image $T_1$ with a width of $W_1$ and a height of $H_1$.

As shown in FIG. 3B, if $A>B$, left and right regions on two opposite sides of the initial image $T_0$, namely, two Y parts need to be cropped to obtain a cropped image T and then the cropped image T is zoomed out by B times to obtain a zoom image $T_1$ with a width of $W_1$ and a height of $H_1$.

The image is not allowed to be stretched and deformed during digital zoom. Therefore, only the cropped image T is zoomed and then the cropped image T is assumed to be zoomed out by A times to obtain the zoom image stored in the memory.

Assuming that a digital zoom-in factor is C, the initial image is zoomed in by C times when being captured by the image sensor of the image capturing apparatus 104 and then is zoomed out by A times when being processed by the image processing unit and transmitted to the memory. The initial image $T_0$ is zoomed in and zoomed out in this process. As a result, the image quality is destructed twice, the image definition may be very poor and the amount of image data to be processed is huge.

Figure 4:
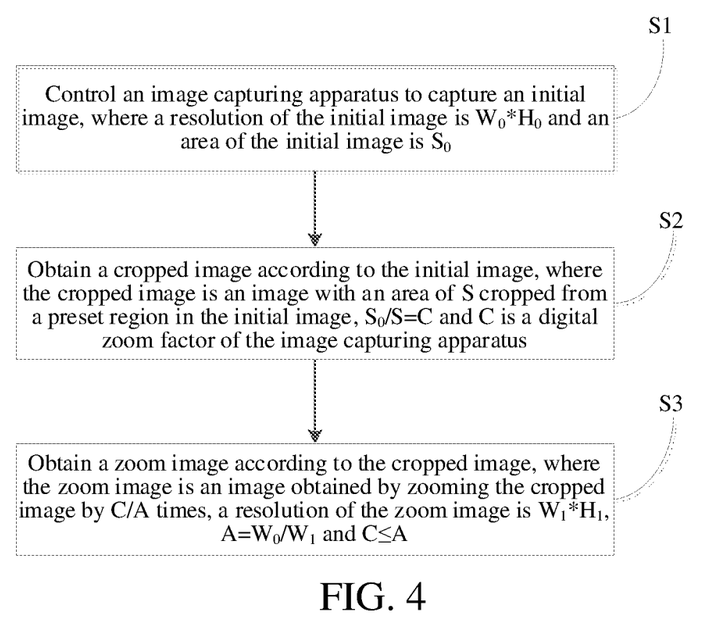
FIG. 4 is a flowchart of steps of a zoom method according to an embodiment of the present invention.

FIG. 4 shows a zoom method provided in the present invention. The zoom method is applied to the unmanned aerial vehicle 10 and is performed by the vision chip of the unmanned aerial vehicle 10. The method includes the following steps:

Step S1: Control the image capturing apparatus to capture an initial image, where a resolution of the initial image is $W_0*H_0$ and an area of the initial image is $S_0$.

Figure 5:
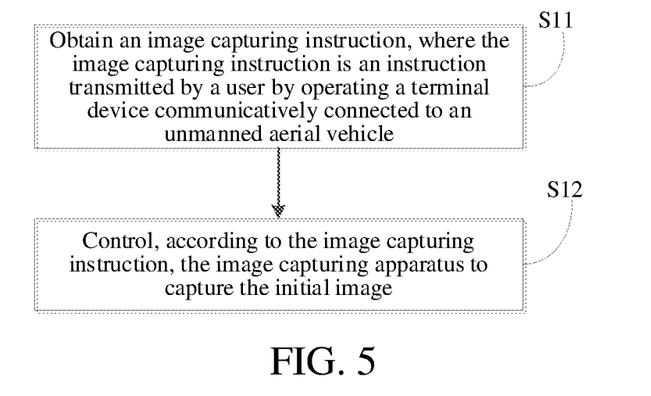
FIG. 5 is a flowchart of step S1 in FIG. 4.

Referring to FIG. 5, the controlling the image capturing apparatus to capture an initial image includes:

Step S11: Obtain an image capturing instruction, where the image capturing instruction is an instruction transmitted by a user by operating a terminal device communicatively connected to the unmanned aerial vehicle.

Step S12: Control, according to the image capturing instruction, the image capturing apparatus to capture the initial image.

For example, when needing to obtain images by using the unmanned aerial vehicle 10, the user operates the terminal device 20 to transmit the image capturing instruction to the unmanned aerial vehicle 10. After receiving the image capturing instruction, the unmanned aerial vehicle 10 controls, according to the image capturing instruction, the image capturing apparatus 104 to obtain the initial image $T_0$.

Step S2: Obtain a cropped image according to the initial image, where the cropped image is an image with an area of S cropped from a preset region in the initial image, $S_0/S=C$ and C is a digital zoom factor of the image capturing apparatus.

Figure 6:
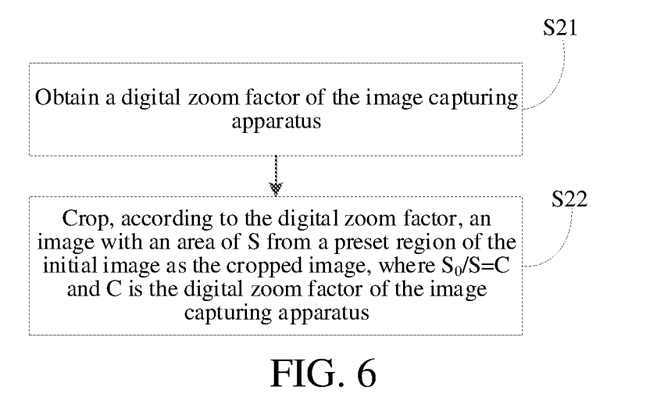
FIG. 6 is a flowchart of step S2 in FIG. 4.

Referring to FIG. 6, in some embodiments, the obtaining a cropped image according to the initial image includes:

Step S21: Obtain a digital zoom factor of the image capturing apparatus.

Step S22: Crop, according to the digital zoom factor, an image with an area of S from a preset region in the initial image as the cropped image, where $S_0/S=C$ and C is the digital zoom factor of the image capturing apparatus.

The image with the area of S cropped from the preset region in the initial image $T_0$ is used as the cropped image, where $S_0/S=C$ and C is the digital zoom factor of the image capturing apparatus.

The preset region is a region having the same central point with the initial image $T_0$.

Step S3: Obtain a zoom image according to the cropped image, where the zoom image is an image obtained by zooming the cropped image by C/A times, a resolution of the zoom image is $W_1*H_1$, $A=W_0/W_1$ and $C \le A$.

Figure 7:
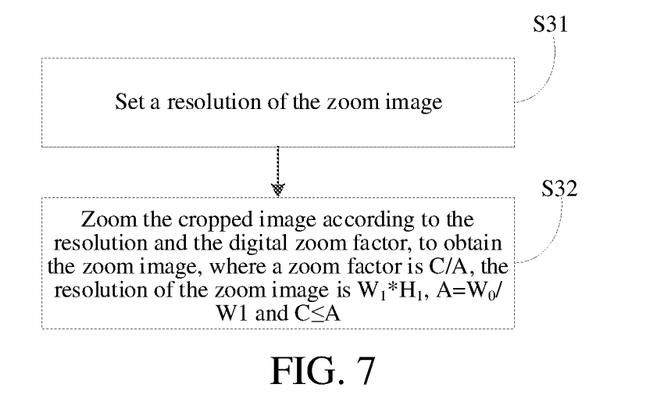
FIG. 7 is a flowchart of step S3 in FIG. 4.

Referring to FIG. 7, in some embodiments, the obtaining a zoom image according to the cropped image includes:

Step S31: Set a resolution of the zoom image.

Step S32: Zoom the cropped image according to the resolution and the digital zoom factor, to obtain the zoom image, where a zoom factor is C/A, the resolution of the zoom image is $W_1*H_1$, $A=W_0/W_1$ and $C \le A$.

For example, the zoom image $T_1$ may be obtained by zooming the cropped image T by C/A times.

If C=A, a digital zoom-in factor is equal to a factor for zooming out the initial image $T_0$ to the zoom image $T_1$. A resolution of 1/C of the image cropped from the initial image $T_0$ is the same as the resolution of the zoom image $T_1$. In this process, the image is completely not zoomed and the image quality is completely not destructed, which is also referred to as completely nondestructive zoom.

If C<A, that is, the digital zoom factor C is not large enough and is less than the factor A for zooming out the initial image $T_0$ to the zoom image $T_1$, 1/C of the cropped image still needs to be zoomed out by C/A times to obtain the zoom image $T_1$. In this process, the image is zoomed out, which is also referred to as nondestructive digital zoom.

If completely digital zoom is required, 1/C of the image rather than an area of 1/C needs to be cropped and then the zoom image $T_1$ is directly obtained without being zoomed out by the image processing unit. In such a process, the image quality is completely not destructed.

For example, if an initial resolution of the image sensor of the image capturing apparatus 104 is 7680*5760, the resolution of the obtained initial image $T_0$ is 7680*5760.

If the memory may select to store the image with a resolution of 8K (width and height of 7680*4320), 4K (width and height of 3840*2160) or 1080P (width and height of 1920*1080), the resolution of the required zoom image $T_1$ may be selected to be 8K (width and height of 7680*4320), 4K (width and height of 3840*2160) or 1080P (width and height of 1920*1080).

When the zoom image $T_1$ is selected to be stored with the resolution of 1080P, the resolution from the original image to the captured image is zoomed out by 7680/1920 times, namely, 4 times.

If the digital zoom factor C is less than 4, for example, C=2, ½ of the image is directly cropped from the image sensor of the image capturing apparatus 104 and then the image is zoomed out by 2 times to be the same as the size of the zoom image $T_1$. Since the initial image $T_0$ is only zoomed out by 2 times in this zoom process, the obtained zoom image $T_1$ is nondestructive compared with originally zooming out the image by 4 times, which is also referred to as nondestructive zoom supporting a maximum zoom factor of 4.

In some embodiments, the zoom method further includes:

transmitting the zoom image to a terminal device communicatively connected to the unmanned aerial vehicle, to display the zoom image on a display screen of the terminal device, where an image resolution of the display screen is less than or equal to $W_1*H_1$.

For example, the unmanned aerial vehicle 10 transmits the captured zoom image $T_1$ to the terminal device 20, to display the zoom image $T_1$ on the display screen of the terminal device 20, where the image resolution of the display screen is less than or equal to $W_1*H_1$.

In some embodiments, the zoom method further includes:

storing the zoom image.

Figure 8:
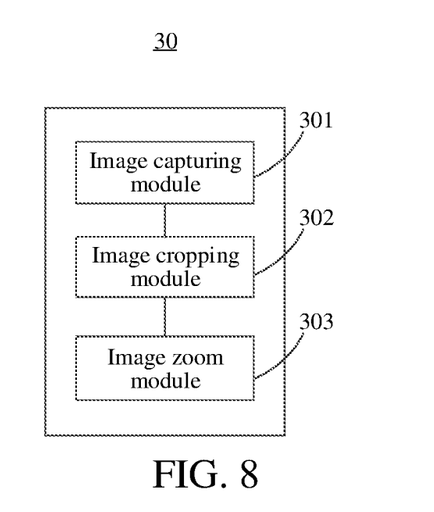
FIG. 8 is a structural block diagram of a zoom apparatus according to the present invention.

Referring to FIG. 8, the present invention further provides a zoom apparatus 30, applied to an unmanned aerial vehicle 10 including an image capturing apparatus 104, the zoom apparatus 30 including:

an image capturing module 301, configured to control the image capturing apparatus to capture an initial image, where a resolution of the initial image is $W_0*H_0$ and an area of the initial image is $S_0$;

an image cropping module 302, configured to obtain a cropped image according to the initial image, where the cropped image is an image with an area of S cropped from a preset region in the initial image, $S_0/S=C$ and C is a digital zoom factor of the image capturing apparatus; and an image zoom module 303, configured to obtain a zoom image according to the cropped image, where the zoom image is an image obtained by zooming the cropped image by C/A times, a resolution of the zoom image is $W_1*H_1$, $A=W_0/W_1$ and $C \le A$.

In some embodiments, the image capturing module 301 is further configured to:

obtain an image capturing instruction, where the image capturing instruction is an instruction transmitted by a user by operating a terminal device communicatively connected to the unmanned aerial vehicle; and control, according to the image capturing instruction, the image capturing apparatus to capture the initial image.

In some embodiments, the image cropping module 302 is further configured to:

obtain a digital zoom factor of the image capturing apparatus; and crop, according to the digital zoom factor, an image with an area of S from a preset region in the initial image as the cropped image, where $S_0/S=C$ and C is the digital zoom factor of the image capturing apparatus.

In some embodiments, the image zoom module 303 is further configured to:

set a resolution of the zoom image; and zoom the cropped image according to the resolution and the digital zoom factor, to obtain the zoom image, where a zoom factor is C/A, the resolution of the zoom image is $W_1*H_1$, $A=W_0/W_1$ and $C \leq A$.

In some embodiments, the zoom apparatus 30 further includes an image transmission module configured to:

transmit the zoom image to the terminal device communicatively connected to the unmanned aerial vehicle, to display the zoom image on a display screen of the terminal device, where an image resolution of the display screen is less than or equal to $W_1*H_1$.

In some embodiments, the zoom apparatus 30 further includes a storage module configured to:

store the zoom image.

Figure 9:
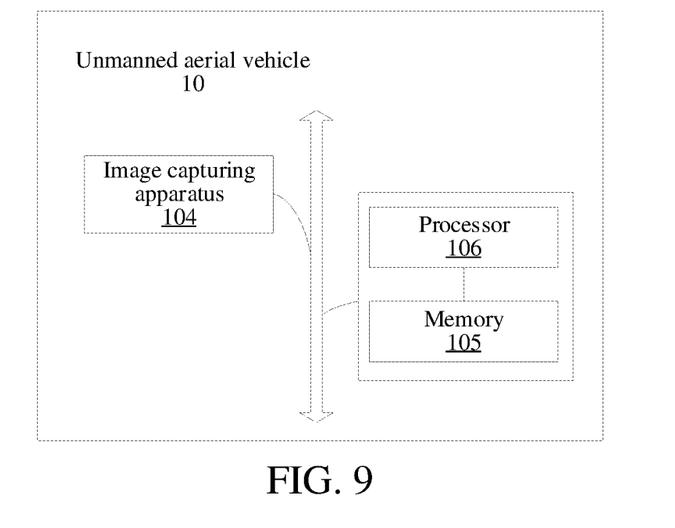
FIG. 9 is a structural block diagram of an unmanned aerial vehicle according to an embodiment of the present invention.

Referring to FIG. 9, in some embodiments, the vision chip of the unmanned aerial vehicle 10 further includes a memory 105 and a processor 106. The memory 10 is electrically connected to the processor 106.

The memory 105 includes at least one type of readable storage medium. The readable storage medium includes a flash memory, a hard disk, a multimedia card, a card-type memory (for example, a secure digital (SD) or DX memory), a magnetic memory, a magnetic disk, an optical disk and the like. In some embodiments, the memory 105 may be an internal storage unit of the unmanned aerial vehicle 10, such as a hard disk of the unmanned aerial vehicle 10. In some other embodiments, the memory 105 may alternatively be an external storage device of the unmanned aerial vehicle 10, such as a plug-in hard disk, a smart media card (SMC), an SD card or a flash card equipped on the unmanned aerial vehicle 10. The memory 105 may be configured to store application software installed in the unmanned aerial vehicle 10 and various data, such as program code of a computer-readable zoom method and may be further configured to temporarily store data that has been outputted or is about to be outputted.

In some embodiments, the processor 106 may be a central processing unit (CPU), a controller, a microcontroller, a microprocessor or another data processing chip. The processor 106 may invoke program code stored in the memory 105 or process data to perform the foregoing zoom method.

The present invention further provides a storage medium. The storage medium stores a zoom program executable on a computer, the zoom program, when invoked by a processor, performing the foregoing zoom method.

The foregoing descriptions are exemplary embodiments of the present invention and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

What is claimed is:

1. A zoom method, applied to an unmanned aerial vehicle comprising an image capturing apparatus, a memory, the method comprising:

controlling the image capturing apparatus to capture an initial image, wherein a resolution of the initial image is $W_0*H_0$ and an area of the initial image is $S_0$;

obtaining a cropped image according to the initial image, wherein the cropped image is an image with an area of S cropped from a preset region in the initial image, $S_0/S=C$ and C is a digital zoom factor of the image capturing apparatus; and obtaining a zoom image according to the cropped image, wherein the zoom image is an image obtained by zooming the cropped image by C/A times, a resolution of the zoom image is $W_1*H_1$, $A=W_0/W_1$, $B=H_0/H$ and $C \leq A$, and storing the zoom image in the memory;

wherein obtaining a cropped image according to the initial image, the method further comprising, if B>A, cropping X parts to the initial image to obtain the cropped image, and zooming out the cropped images by A times to obtain the zoom image with a width of $W_1$ and a height of $H_1$, X parts is upper and lower regions on two opposite sides of the initial image;

if A>B, cropping Y parts to the initial image to obtain the cropped image, and zooming out the cropped images by B times to obtain the zoom image with a width of $W_1$ and a height of $H_1$, Y parts is left and right regions on two opposite sides of the initial image.

2. The method according to claim 1, wherein the controlling the image capturing apparatus to capture an initial image comprises:

obtaining an image capturing instruction, wherein the image capturing instruction is an instruction transmitted by a user by operating a terminal device communicatively connected to the unmanned aerial vehicle; and controlling, according to the image capturing instruction, the image capturing apparatus to capture the initial image.

3. The method according to claim 2, further comprising:

transmitting the zoom image to the terminal device communicatively connected to the unmanned aerial vehicle, to display the zoom image on a display screen of the terminal device, wherein an image resolution of the display screen is less than or equal to $W_1*H_1$.

4. The method according to claim 1, wherein the obtaining a cropped image according to the initial image comprises:

obtaining a digital zoom factor of the image capturing apparatus; and cropping, according to the digital zoom factor, an image with an area of S from a preset region in the initial image as the cropped image, wherein $S_0/S=C$ and C is the digital zoom factor of the image capturing apparatus.

5. The method according to claim 1, wherein the obtaining a zoom image according to the cropped image comprises:

setting a resolution of the zoom image; and zooming the cropped image according to the resolution and the digital zoom factor, to obtain the zoom image, wherein a zoom factor is C/A, the resolution of the zoom image is $W_1*H_1$, $A=W_0/W_1$ and $C \leq A$.

6. An unmanned aerial vehicle, comprising a vehicle body, vehicle arms connected to the vehicle body, power apparatuses disposed on the vehicle arms, an image capturing apparatus connected to the vehicle body and a vision chip disposed in the vehicle body, wherein the vision chip comprises:

a memory and a processor, wherein the image capturing apparatus is electrically connected to the processor;

the memory is configured to store a zoom program executable on a computer; and the processor is configured to invoke the zoom program executable on the computer to:
control the image capturing apparatus to capture an initial image, wherein a resolution of the initial image is $W_0*H_0$ and an area of the initial image is $S_0$;
obtain a cropped image according to the initial image, wherein the cropped image is an image with an area of S cropped from a preset region in the initial image, $S_0/S=C$ and C is a digital zoom factor of the image capturing apparatus; and
obtain a zoom image according to the cropped image, wherein the zoom image is an image obtained by zooming the cropped image by C/A times, a resolution of the zoom image is $W_1*H_1$, $A=W_0/W_1$, $B=H_0/H$ and $C \leq A$;
and storing the zoom image in the memory;
wherein obtaining a cropped image according to the initial image, the method further comprising,
if B>A, cropping X parts to the initial image to obtain the cropped image, and zooming out the cropped images by A times to obtain the zoom image with a width of $W_1$ and a height of $H_1$, X parts is upper and lower regions on two opposite sides of the initial image;
if A>B, cropping Y parts to the initial image to obtain the cropped image, and zooming out the cropped images by B times to obtain the zoom image with a width of $W_1$ and a height of $H_1$, Y parts is left and right regions on two opposite sides of the initial image.

7. The unmanned aerial vehicle according to claim 6, wherein the processor is further configured to:
obtain an image capturing instruction, wherein the image capturing instruction is an instruction transmitted by a user by operating a terminal device communicatively connected to the unmanned aerial vehicle; and
control, according to the image capturing instruction, the image capturing apparatus to capture the initial image.

8. The unmanned aerial vehicle according to claim 7, wherein the processor is further configured to:
transmit the zoom image to the terminal device communicatively connected to the unmanned aerial vehicle, to display the zoom image on a display screen of the terminal device, wherein an image resolution of the display screen is less than or equal to $W_1*H_1$.

9. The unmanned aerial vehicle according to claim 6, wherein the processor is further configured to:
obtain a digital zoom factor of the image capturing apparatus; and
crop, according to the digital zoom factor, an image with an area of S from a preset region in the initial image as the cropped image, wherein $S_0/S=C$ and C is the digital zoom factor of the image capturing apparatus.

10. The unmanned aerial vehicle according to claim 6, wherein the processor is further configured to:
set a resolution of the zoom image; and
zoom the cropped image according to the resolution and the digital zoom factor, to obtain the zoom image, wherein a zoom factor is C/A, the resolution of the zoom image is $W_1*H_1$, $A=W_0/W_1$, and $C \leq A$.

11. An unmanned aircraft system, comprising an unmanned aerial vehicle and a terminal device communicatively connected to the unmanned aerial vehicle, the unmanned aerial vehicle comprising a vehicle body, vehicle arms connected to the vehicle body, power apparatuses disposed on the vehicle arms, an image capturing apparatus connected to the vehicle body and a vision chip disposed in the vehicle body, wherein the vision chip comprises:
at least one processor; and
a memory, communicatively connected to the at least one processor, the memory storing instructions executable by the at least one processor, the instructions being executed by the at least one processor to cause the at least one processor to perform the following steps:
controlling the image capturing apparatus to capture an initial image, wherein a resolution of the initial image is $W_0*H_0$ and an area of the initial image is $S_0$;
obtaining a cropped image according to the initial image, wherein the cropped image is an image with an area of S cropped from a preset region in the initial image, $S_0/S=C$ and C is a digital zoom factor of the image capturing apparatus; and
obtaining a zoom image according to the cropped image, wherein the zoom image is an image obtained by zooming the cropped image by C/A times, a resolution of the zoom image is $W_1*H_1$, $A=W_0/W_1$, $B=H_0/H$ and $C \leq A$;
and storing the zoom image in the memory;
wherein obtaining a cropped image according to the initial image, the method further comprising,
if B>A, cropping X parts to the initial image to obtain the cropped image, and zooming out the cropped images by A times to obtain the zoom image with a width of $W_1$ and a height of $H_1$, X parts is upper and lower regions on two opposite sides of the initial image;
if A>B, cropping Y parts to the initial image to obtain the cropped image, and zooming out the cropped images by B times to obtain the zoom image with a width of $W_1$ and a height of $H_1$, Y parts is left and right regions on two opposite sides of the initial image.

12. The unmanned aircraft system according to claim 11, wherein the processor is further configured to:
obtain an image capturing instruction, wherein the image capturing instruction is an instruction transmitted by a user by operating the terminal device communicatively connected to the unmanned aerial vehicle; and
control, according to the image capturing instruction, the image capturing apparatus to capture the initial image.

13. The unmanned aircraft system according to claim 11, wherein the processor is further configured to:
obtain a digital zoom factor of the image capturing apparatus; and
crop, according to the digital zoom factor, an image with an area of S from a preset region in the initial image as the cropped image, wherein $S_0/S=C$ and C is the digital zoom factor of the image capturing apparatus.

14. The unmanned aircraft system according to claim 11, wherein the processor is further configured to:
set a resolution of the zoom image; and
zoom the cropped image according to the resolution and the digital zoom factor, to obtain the zoom image, wherein a zoom factor is C/A, the resolution of the zoom image is $W_1*H_1$, $A=W_0/W_1$ and $C \leq A$.

15. The unmanned aircraft system according to claim 11, wherein the processor is further configured to:
transmit the zoom image to the terminal device communicatively connected to the unmanned aerial vehicle, to display the zoom image on a display screen of the terminal device, wherein an image resolution of the display screen is less than or equal to $W_1*H_1$.

* * * * *